United States Patent [19]

Kumar et al.

[11] Patent Number: 4,744,022
[45] Date of Patent: May 10, 1988

[54] PROGRAMMABLE CONTROL APPARATUS INCLUDING AN ABSOLUTE POSITION TRANSDUCER

[75] Inventors: Shalabh Kumar, Kildeer; Duane Edgar, Schaumburg, both of Ill.

[73] Assignee: Autotech Corporation, Carol Stream, Ill.

[21] Appl. No.: 740,669

[22] Filed: Jun. 3, 1985

[51] Int. Cl.⁴ .............................................. G06F 15/46
[52] U.S. Cl. .................................... 364/142; 318/626; 364/167; 364/900
[58] Field of Search ............... 364/142, 167, 174, 130, 364/550, 551, 559, 560, 561, 571, 200 MS File, 900 MS File, 136, 138, 139, 183, 140, 141; 318/626, 466–470

[56] References Cited

U.S. PATENT DOCUMENTS

| | | | |
|---|---|---|---|
| 4,056,850 | 11/1977 | Brown | 364/561 X |
| 4,123,750 | 10/1978 | Leney et al. | 364/167 X |
| 4,156,796 | 5/1979 | O'Neal et al. | 364/900 X |
| 4,156,926 | 5/1979 | Hartman | 364/900 |
| 4,158,226 | 6/1979 | Struger et al. | 364/900 X |
| 4,242,621 | 12/1980 | Spaulding | 364/167 X |
| 4,283,773 | 8/1981 | Daughton et al. | 364/900 |
| 4,401,930 | 8/1983 | Kato et al. | 364/167 X |
| 4,470,108 | 9/1984 | Kato et al. | 318/626 X |
| 4,479,078 | 10/1984 | Kidd et al. | 318/254 |
| 4,511,884 | 4/1985 | Serev et al. | 364/900 X |
| 4,628,436 | 12/1986 | Okamoto et al. | 364/131 |

Primary Examiner—Joseph Ruggiero
Attorney, Agent, or Firm—Thomas R. Vigil

[57] ABSTRACT

The programmable control apparatus includes an absolute position transducer capable of being mechanically coupled to a machine and electrical circuitry for generating signals indicative of and related to the machine position, a programming unit including a microcomputer, visual display device, program input circuitry, one or more programmable memory position output devices (PMPODs) each of which includes a non-volatile memory, latching circuitry and output interface circuitry, and terminal blocks for interconnection of the absolute position transducer to the programming unit or the PMPOD.

26 Claims, 4 Drawing Sheets

FIG. 4 — SCALE FACTOR ENTRY ROUTINE

FIG. 5 — OFFSET COMPUTATION ROUTINE

FIG. 6

FIG. 7 - PMPOD PROGRAMMING

PROGRAMMABLE CONTROL APPARATUS INCLUDING AN ABSOLUTE POSITION TRANSDUCER

BACKGROUND OF THE INVENTION

1. Field of the Invention

The present invention relates to a programmable control apparatus which includes a programming unit, an absolute position transducer for rapidly determining the absolute position of a machine to which the transducer is coupled and at least one control device which provides programmable switch outputs to the machine being controlled to cause starting or stopping of desired functions during each machine cycle such as one complete revolution of the machine shaft.

2. Description of the Prior Art

Heretofore various programmable control apparatus including an absolute position transducer have been proposed. Often such apparatus required mental calculations by the user to establish desired functions and could only be utilized to a limited number of setpoints.

Often such apparatus required extensive idle machine time due to the time required for the apparatus to have control parameters entered or altered.

Typically in a prior art apparatus a serial requested operation is performed where an encoder is read, and the signal therefrom is then multiplied by a scale factor and compared with a setpoint. Then, an output is turned on and latched resulting in limited speed of response.

As will be described in greater detail hereinafter, the programmable control apparatus of the present invention differs from the previously proposed control apparatus, programmable controllers and programmable limit switches by providing an apparatus whose only limitation in the number of programmable setpoints is the user's desired resolution and the absolute position transducer's resolution. Further, the apparatus of the present invention provides for a large number of control output channels whose response to a change of position of the input shaft is one or two orders of magnitude faster than that obtained with presently available programmable control apparatus or programmable limit switches. Moreover, the programmable control apparatus of the present invention can eliminate mental calculations on the part of the user and can also provide combined output and setpoint programmable modules which retain their programmed information for up to ten years with no power applied.

SUMMARY OF THE INVENTION

According to the invention there is provided a programmable control apparatus which can be capable of accepting either analog or digital data from an associated position transducer which can be either a rotary or a linear transducer mechanically coupled to the machine. The signals provided by the position transducer are indicative of and related to the machine's position. The programmable control apparatus consists of a programming unit and programmable switch devices. The programmable switch devices are connected to the position transducer and include electrical circuitry for generating control outputs to the machine and memory storage for a setpoint program. The programming unit includes a microcomputer, visual displays and a data input device. If the programming unit and the programmable switch devices are not integrated into the same housing, a method of mutual interconnection is provided on the devices.

In the apparatus of the present invention the position of an absolute position transducer is read and an index address is developed. The index address can include transducer position and scale factor and/or offset if necessary. A memory containing the setpoint program is addressed with the index address and all outputs from the memory are updated to cause starting or stopping of desired machine functions.

DESCRIPTION OF THE PREFERRED EMBODIMENT

Figure 1:
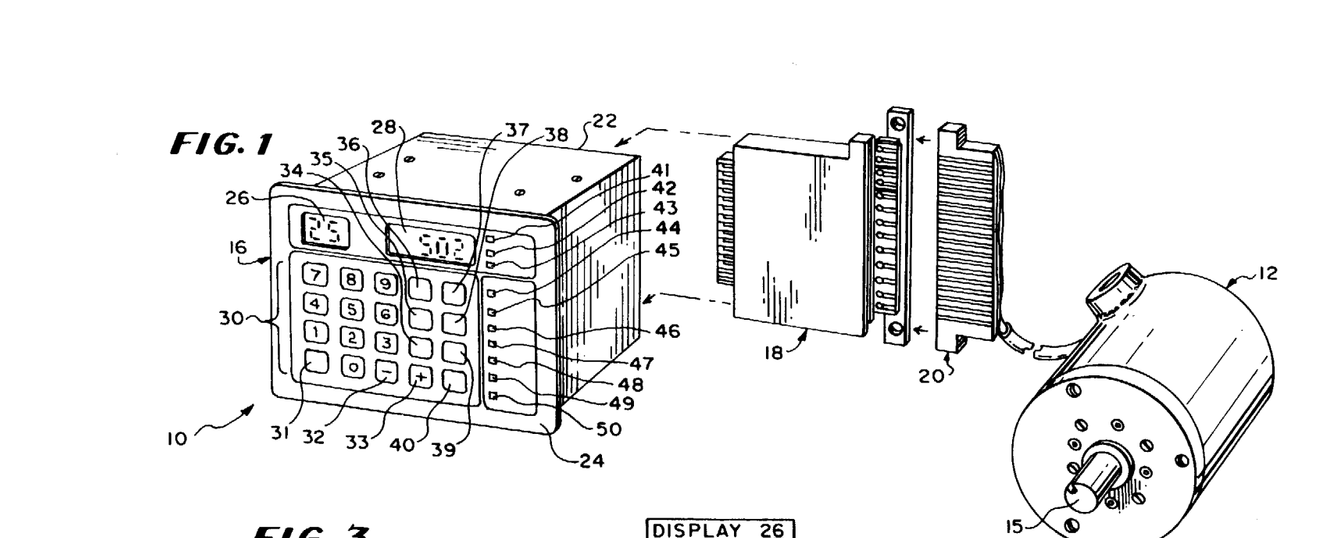
FIG. 1 is a perspective view of one form of the programmable control apparatus of the present invention where a programming unit, absolute position transducer decoding, program storage, and programmable switch and output circuitry devices are all integrated into one housing.

Referring now to the drawings in greater detail, there is illustrated in FIG. 1 a programmable control apparatus 10 which is constructed according to the teachings of the present invention and which includes an absolute position transducer 12 having a shaft 15 mechanically coupled to a machine shaft and electrical interconnection coupled to a programming unit 16 which is adapted to have mounted therein one or more cam modules or programmable memory position output devices, PMPODS 18, one of which is shown in FIG. 1. Each PMPOD 18 includes a non-volatile memory so that setpoint information can be retained therein without power. This permits preprogramming of various PMPODs 18 for different jobs or preprogramming of spare PMPODs 18 to reduce down time and eliminate eventual errors which could be caused by hurried reprogramming at a job site if a replacement PMPOD 18 is needed. Also, the PMPODs 18 can be programmed at a central location, such as at a corporate headquarters, and then distributed to various plant locations.

The apparatus 10 further includes a terminal block 20 for coupling the position transducer 12 to the programming unit 16. In some models (FIG. 1), the PMPODs 18 are easily insertable and removable from the back of the housing 22 of the programming unit 16 which has a number of slots for receiving PMPODs 18. The programming unit 16 has a terminal block for power input and position transducer connection.

In other models (FIG. 2), PMPODs 18', are stand-alone modules to which the absolute-position transducer 12 is connected, and require an external programming unit 19. The PMPODs 18 or 18' include output circuitry and terminals for interconnection directly to the machine's control circuitry.

Each PMPOD 18 has at least eight output channels and the apparatus 10 can have provision for as many PMPOD's 18 as required for a given application. In this way, many output control channels can be housed in a compact space. Using the teachings of this invention, a virtually unlimited number of output channels can be housed in a small compact space.

Scale factor and position offset are stored in a non-volatile memory in a microcomputer of the programming unit 16. In models where scale factor and position offset are user-programmable, parameters are stored in the non-volatile memory as they are entered. The information is retained indefinitely after power is removed.

Scale factor is defined as the number of programmable divisions in one rotation of the position transducer shaft 15. Position offset is a number that is added to the position transducer's actual position and is used to calibrate the programmable control apparatus 10 to the machine being controlled. The programming unit 16 incorporates an "Auto Zero" capability which eliminates all calculations on the part of the machine operator while at the same time achieving matching of position transducer shaft 15 "zero" to machine shaft "zero". In other words, after the position transducer 12 is mounted on the machine shaft, all one has to do is to align the machine to a mechanical zero reference, such as top dead center on a press, and "Auto Zero" the programming unit 16 by entering a short programming sequence. Any position transducer offset will automatically be calculated and programmed so that the position display reads 0. Additional offsets, referenced to the "Auto Zero" offset, and thus to machine zero, can also be entered, if desired.

All output channels available can be preprogrammed for multiple on and off setpoints with the only restriction being the scale factor selected. In this respect, if a scale factor of 1000 is selected, up to 500 on and off (dual) setpoints can be programmed on each output channel. Furthermore, dwell setpoints can be programmed through 0, e.g., "on" at 350 and "off" at 20.

When one PMPOD 18 needs to be programmed identically to another PMPOD, the programming apparatus 10 has a special provision (DUP) which allows the copying of the setpoint program in one PMPOD to another PMPOD by entering a simple programming sequence.

Figure 2:
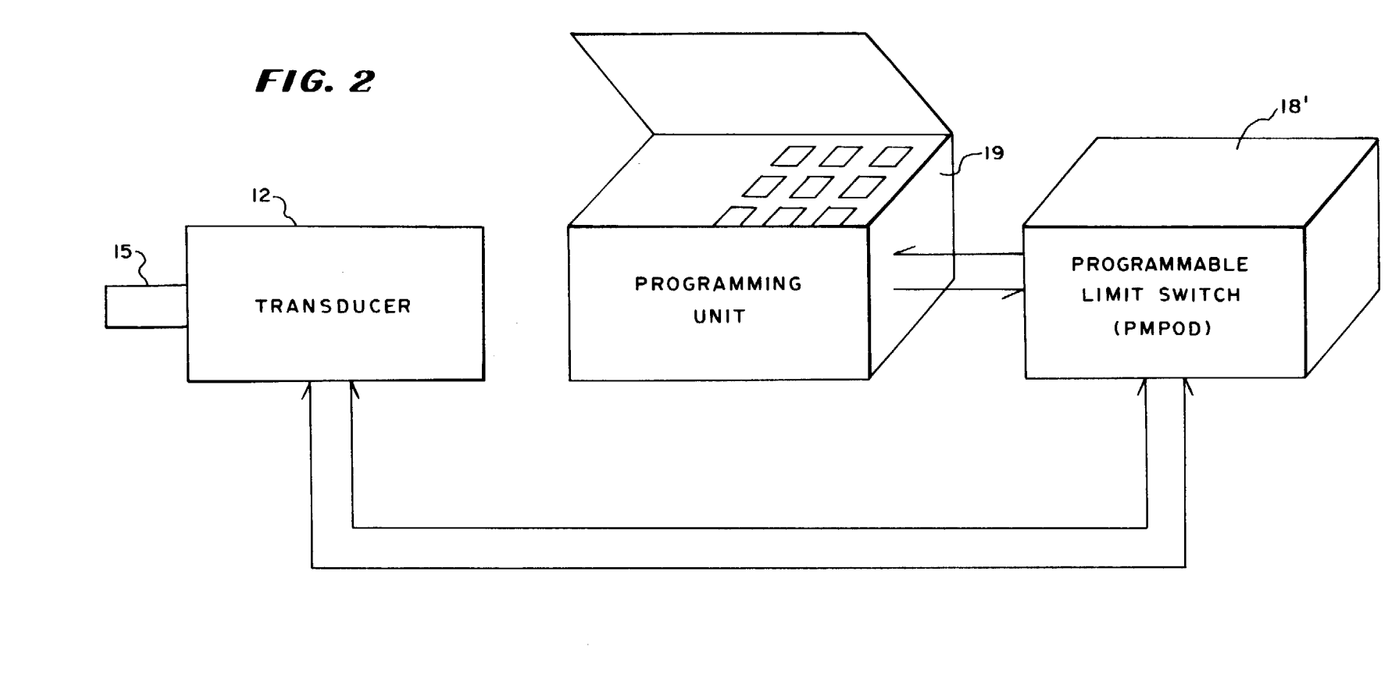
FIG. 2 is a diagram of another form of the programmable control apparatus where the programming unit is in a separate housing from programmable switch and output circuitry devices (programmable memory position output devices referred to as PMPODs) mounted in the housing shown in FIG. 1.
Figure 4:
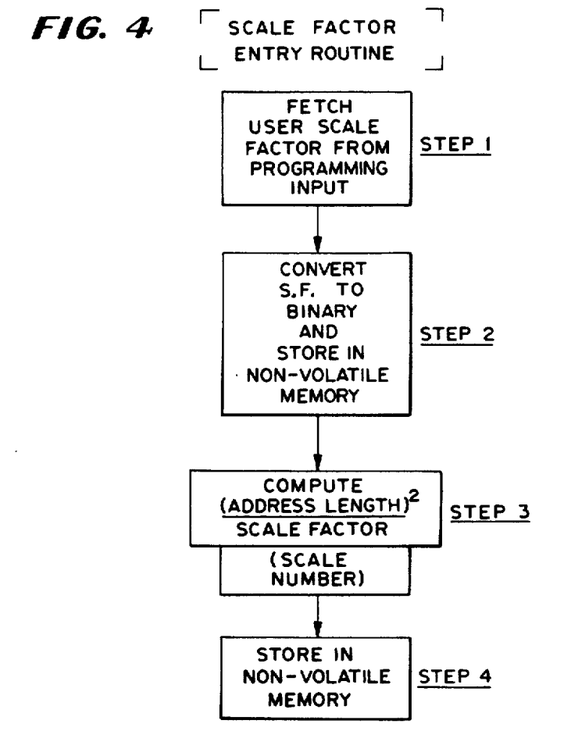
FIG. 4 is a flow diagram of a scale factor entry routine and sets forth the operational steps performed by the programming unit in identifying to the control apparatus the applicable control resolution desired by the user.

According to the teachings of this invention, the high speed of reaction of a PMPOD 18 to an incremental change of shaft position is due to the fact that the absolute position transducer's output, whether decoded from an analog signal or provided in digital format by the transducer itself, is a memory address to the PMPOD 18. The PMPOD's preprogrammed setpoint data address is mapped by the programming unit 16 to match the absolute position transducer's shaft position data address. The data programmed into each PMPOD address location is the "on" or true value or "off" or false value for each memory bit. Typically, electronic solid-state memory devices are organized to have eight bits of data at each address location. Thus, when the selected memory's contents are addressed by the absolute position transducer 12, each bit's information is directly transferred to a control output. In the invention's simplest form, as shown in FIGS. 2 and 4, the only practical limitation to the reaction time of the programmable control apparatus is the rate at which the absolute position transducer 12 can accurately provide a position address output corresponding to the shaft 15 position.

As a result, the teachings of this invention guarantee perfect machine operation even at machine speeds of 2400 RPM. Thus, the reaction time of the control apparatus 10 is at least two orders of magnitude faster than the reaction time of previously provided programmable controllers and at least one order of magnitude faster than the reaction time of any currently available programmable limit switch. All the setpoint variables are active in memory in one of the PMPODs 18 immediately, as the setpoints are entered by the user. This feature permits program changes and fine-tuning while the machine is operating at full speed.

Up to forty channels can be established using five modules or PMPODs 18 with eight channels each. As a result, a PMPOD 18 with desired logic output or separate chassis with plug-in power relay units can be selected to match the job application. Typically, parallel BCD position and TACH output PMPODs 18 are inserted in the fourth and fifth slots in the back of the housing 22.

The scale factor, offset, dwell setpoints and motion detector setpoints are all stored in the non-volatile EEROM memory as they are entered by the user. The information then is retained indefinitely after power or machine shutdown in view of the non-volatile EEROM memory, eliminating the need for backup batteries.

The PMPODs 18 can be provided with TTL, PNP or NPN type logic circuits. If desired, optional electrical mechanical relays (10 amp) and solid-state AC (3 amp) or DC (2 amp) relays can be mounted on a separate chassis (not shown). All such relays (not shown) are plug-in type relays for easy field replacement. Furthermore, the solid-state relays can be optically isolated.

Also, if desired, parallel BCD position and TACH output modules can be provided with built in programmable controller (PC) handshake logic as well as an analog TACH output logic for remote readouts or remote control devices.

The absolute position transducer 12 is typically a resolver encoder 12, i.e., a rugged brushless type resolver encoder which can be mounted on a machine shaft in any hostile environment where it will be exposed to mechanical shock, vibrations, extreme humidity and temperature changes, oil mist, coolants, solvents, etc. with the programming unit 16 mounted at a distance of up to 2500 feet away in a control panel. Typically such resolver encoder is of the type that assures a high tracking speed of up to at least 2400 RPM and high noise immunity. Such a resolver encoder 12 can be a heavy duty resolver of the type sold under Model No. RL100 by Autotech Corporation of Carol Stream, Ill.

The control unit 16 has a front control panel 24 mounted to the front side of the housing 22. Such panel 24 has a visual display 26 for the channel that is monitored and a visual display 28 for the position/RPM of the resolver encoder shaft 15.

The panel 24 further has a keyboard 30 of tactile touch buttons or keys. This keyboard 30 of touch buttons or keys includes numerical buttons or keys 0 to 9 as shown. Also provided are a recall button 31, a "−" button 32, a "+" button 33, a channel ON/OFF button 37, an offset/scale factor button 38, a TACH button 39, and a program duplication button 40. The keyboard 30 of tactile touch buttons 31-40 for initiating various functions is designed for simple front panel programming.

The offset button 38 permits a position offset, eliminates calculations for "Auto-Zero", and provides numerical offset or fine tuning.

The "+" and "−" touch buttons 32 and 33 enable fine-tuning in motion. The DUP touch button 40 enables program duplications from one PMPOD 18 to another PMPOD 18.

Also provided on the front panel 24 are indicator lights 41-50 for, respectively, position, TACH, motion, angle, channel, ON/OFF, offset, scale factor, motion set high, and motion set low.

The button 38 also is utilized for scale factoring and enables a programmable scale factor from 16 to 999 to be programmed into the programming unit 16.

With the absolute position transducer 12 mounted on a machine shaft and connected by the terminal block to the programming unit 16 mounted in a machine control panel, accurate and fast tracking of the movement and position of a rotating machine shaft is obtained.

The absolute position transducer 12 provides an analog signal proportional to the shaft position. This position is converted to digital format by an internal ratiometric tracking converter (conversion circuitry 62 in FIG. 3) in the programming unit 16 and displayed on the visual display 28 on the front panel 16. An index address is developed from the digital format of the shaft position and a memory containing a setpoint program is addressed with the index address and all outputs from the memory are updated to cause starting or stopping of desired machine functions. When the process cycle of the rotating machine shaft reaches the various setpoints, outputs are enabled or disabled causing starting or stopping of functions desired during the process cycle.

The apparatus 10 always provides the true absolute position even upon machine movement after a power outage.

Through use of the offset/scale factor button 38, versatile full scale programmable offset can be obtained and this eliminates all calculations on the part of the operator while at the same time achieving matching of resolver shaft 15 "zero" to machine shaft "zero".

Further, to obtain a precise machine operation, the offset also can be fine-tuned in motion by using the "+" and "−" keys 33 and 32.

The control unit has a built in tachometer which can be activated by pressing the tachometer touch button 39. When this is done, the visual display 28 will display a shaft speed in RPM.

In the tachometer mode of operation, a motion detection "window" with low and high preset points can be programmed. In this respect, direct entry of a high RPM limit and direct entry of a low RPM limit is provided together with independent fine-tuning. This permits quick programming and in-motion adjustments. The motion detector status is indicated on the front panel by indicating lamp 43.

When more than one PMPOD 18 needs to be programmed identical to another PMPOD 18, DUP touch button 40 is utilized. In this respect, an operator merely has to enter the ORIGIN slot number, then select the COPY slot followed by pressing of the duplication touch button 39 and the program is copied on the corresponding PMPOD 18.

A parallel BCD output module can be provided with built in PC-handshake logic for easy interface to programmable controllers or a remote display. Such module is plugged into slot 4 or 5 in the back of the housing 22.

The high speed ratiometric resolver to digital converter circuitry (conversion circuitry 62 in FIG. 3) in the programming unit 16 together with a micro-scan time of 50-100 microseconds guarantees perfect machine operation at speeds of up to at least 2400 RPM. All the program variables are active in the memory in one of the PMPODs 18 immediately, as they are entered by the user. This feature permits program changes and fine-tuning while the machine is in full motion at 2400 RPM. In this respect, the "+" and "−" touch buttons 33 and 32 are especially useful for fine-tuning the machine control for maximum productivity.

The apparatus 10 of the present invention converts the signal from the transducer 12 to digital form and then compares all the setpoints on all the forty channels and activates all the outputs in a maximum of 100 microseconds. This is at least two orders of magnitudes faster than the speed obtainable with previously provided programmable controllers and at least one order of magnitude faster than the speed obtainable with any currently available programmable limit switches. In this respect, with one eight channel PMPOD 18 plugged into the housing 22, the scan time can be approximately 57 microseconds.

The absolute position transducer or resolver encoder 12 includes an eight to twenty bit binary output. The function of this resolver encoder 12 is to provide the programming unit 16 with a number which is a precise description of the position of the resolver encoder shaft 15.

Figure 3:
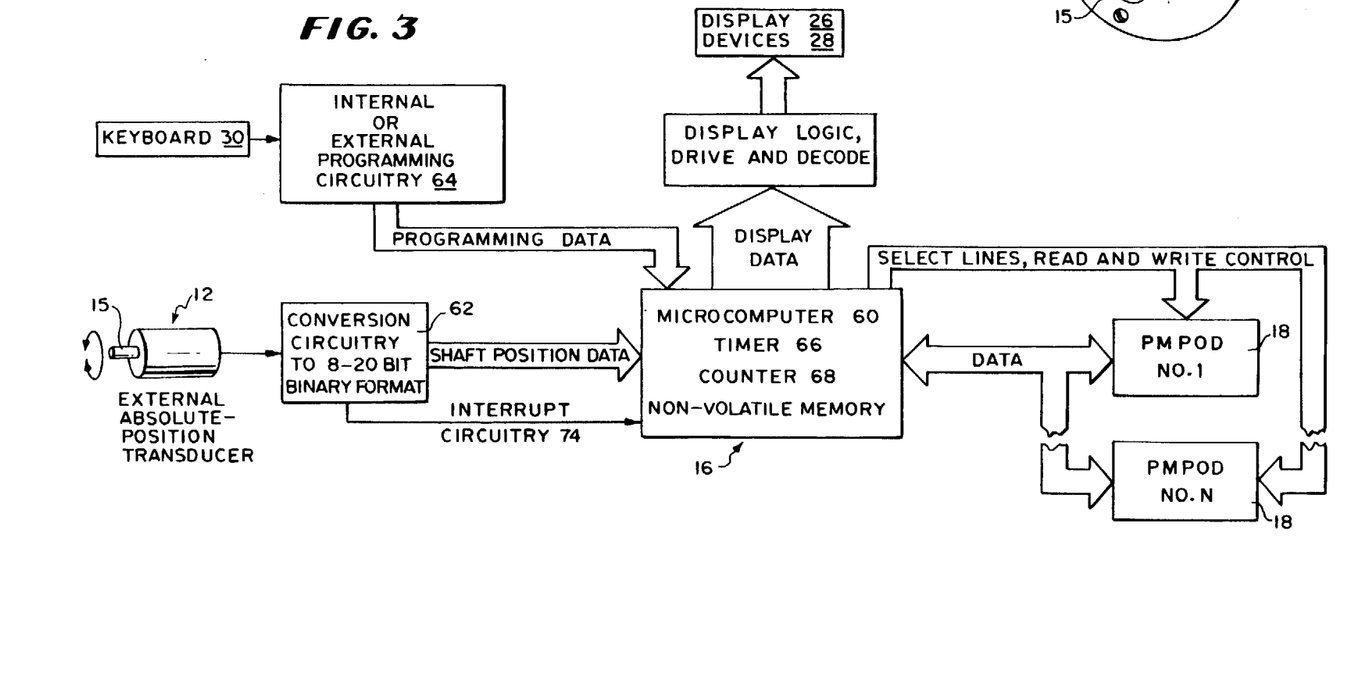
FIG. 3 is a schematic block diagram of the programmable control apparatus of FIG. 1 and shows the elements of the control apparatus in block form.

The programming unit 16 includes a microcomputer 60 (FIG. 3). The actual encoder resolution used is defined in the microcomputer as the ADDRESS LENGTH. Another input to the microcomputer 60 is a programming input which can be either the built-in keyboard 30 or another computer. The programming input circuitry 64 enables an operator to define and input such parameters as scale factor, position offset, and position setpoints in his own units whether they are rotary units such as degrees or linear units such as inches or millimeters.

In the use of the programmable control apparatus 10, certain terms are referred to and these terms can be defined as follows:

SCALE FACTOR: Scale factor is defined as the number of programmable divisions in one rotation of the position transducer shaft 15.

SCALE NUMBER: The scale number is address length multiplied by address length and divided by the scale factor.

USER POSITION OFFSET: The user position offset is defined in scale factor units by the user. The total position offset is converted by the programmable control apparatus 10 into the machine offset which is the scale number times the user offset divided by the address length.

MACHINE POSITION: The machine position is the actual number indicated from the absolute position transducer plus the total of the "Auto Zero" and machine offsets and rationalized to always be less than the maximum value of the address length. The machine position is only used within the programming unit 16, namely within the microcomputer thereof.

USER POSITION: The user position is equal to the machine position multiplied by the scale factor and divided by the address length.

As shown in FIG. 3, the main elements of the programming unit 16 are the microcomputer 60 together with its non-volatile memory. Coupled to the microcomputer 60 in addition to the programming input circuitry 64 and the optional absolute position transducer conversion circuitry 62 are one or more programmable memory position output devices 18 referred to as PMPODs 18, two of which are shown in FIG. 3 and referred to with reference numeral 18, and one of which is shown in FIG. 2. The PMPODs 18 are preprogrammed by an operator to provide outputs whose duration is a fraction of the scale factor defined above. Thus, if the scale factor is programmed to be in degrees, the PMPODs 18 are automatically programmed in degrees from the programming input and the programming circuitry 64. That is, each unit programmed into the PMPODs 18 is a number of absolute-position-transducer defined memory addresses equal to the nearest integer of address length divided by the scale factor. A PMPOD 18 with eight bits of data at each address is capable of controlling eight individual switch outputs. It is to be noted that programming of the PMPODs 18 does not include any offset.

The operation of the programmable control apparatus 10 can be briefly summarized as follows:

When the PMPODs 18 are used without the programming apparatus 10, their memory address inputs are connected to the output of an absolute position transducer 12 whose address length and address format conforms to the PMPOD memory address length and address format. As the transducer's shaft 15 is rotated, its output position address changes to conform to changes in the shaft position. The PMPOD's memory data outputs are wired to its control outputs and thus, the control outputs respond with the programmed control output in response to the incoming shaft position data.

When the PMPODs 18 are used in conjunction with the programmable control apparatus 10, a small incremental change in the absolute position transducer's shaft position interrupts the microcomputer via the interrupt circuit 74 shown in FIG. 3. The microcomputer 60 then reads the absolute position transducer's position. Next, the microcomputer 60 adds the machine offset to the position to form what is referred to as the low index. Then, using a different high index for each PMPOD 18, the low and high indexes are combined and the correct memory location in each PMPOD 18 is read.

When a PMPOD's address is read, the data stored at that particular address are the control outputs for that particular absolute position transducer 12 position and offset combination. The data are latched during the memory readout operation in data latching circuitry housed within the PMPODs 18 and such latches are not again updated until the shaft 15 moves far enough to interrupt the microcomputer 60 via the interrupt circuitry 74 to repeat the process.

In FIG. 4 is set forth a flow chart of the scale factor length routine carried out by the microcomputer 60. The steps of the routine are as follows:

STEP 1. At Step 1 the microcomputer 60 fetches the user scale factor from the programming input.

STEP 2. At Step 2 the microcomputer converts the scale factor to a binary number and stores it in the main non-volatile memory.

STEP 3. At Step 3, the microcomputer 60 computes the scale number which is the address length squared divided by the scale factor.

STEP 4. At Step 4 the microcomputer 60 stores the scale number and the binary scale factor in the main non-volatile memory.

Figure 5:
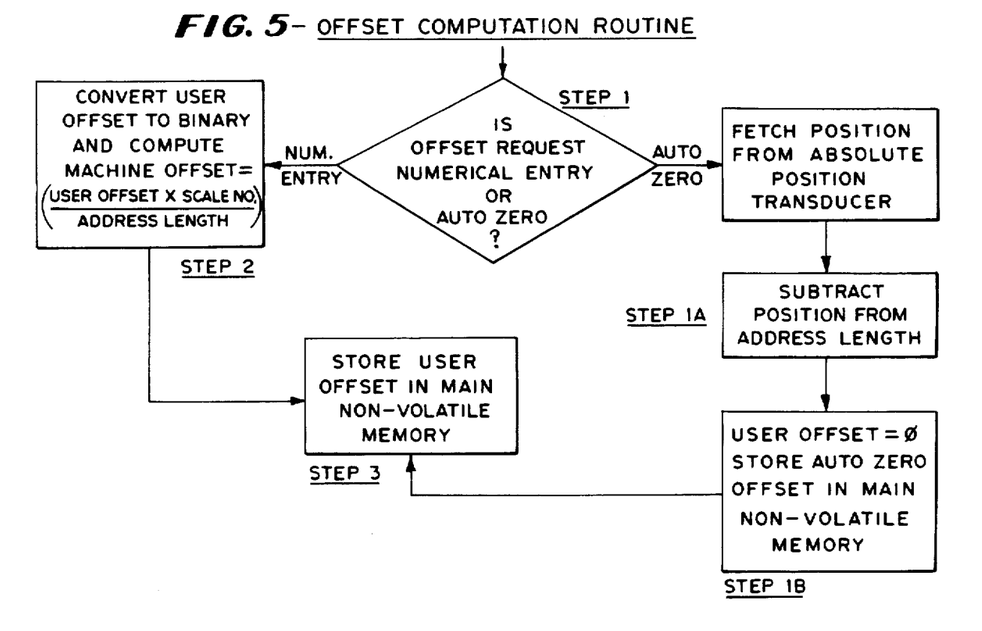
FIG. 5 is a flow diagram of an offset computation routine and sets forth the operational steps performed by the programming unit in identifying to the control apparatus what user-defined position offset will be applicable.

In FIG. 5 is set forth a flow chart of the offset computation routine carried out by the microcomputer 60. The steps of this routine are as follows:

STEP 1. At Step 1 the microcomputer 60 distinguishes between an "Auto Zero" offset request and a numerical entry offset request. If an "Auto Zero" programming request is made, the routine proceeds starting with Step 1A, otherwise, it skips ahead to Step 2.

STEP 1A. At Step 1A the microcomputer 60 subtracts the present absolute position transducer position from the address length.

STEP 1B. At Step 1B the microcomputer 60 sets the user offset equal to 0, stores the "Auto Zero" offset in the non-volatile memory and proceeds to Step 3 below.

STEP 2. At Step 2 the microcomputer 60 converts the user offset to a binary number and then computes the machine offset by adding the "Auto Zero" offset to the binary user offset times the scale number divided by the address length.

STEP 3. At Step 3 the microcomputer 60 stores the machine offset in the main non-volatile memory.

Figure 6:
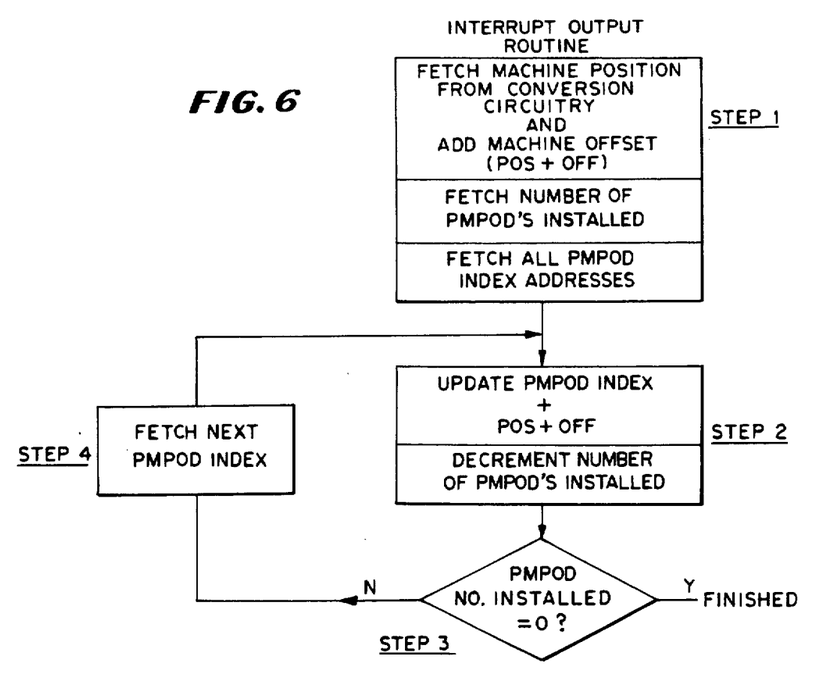
FIG. 6 is a flow diagram of the interrupt output routine and sets forth the operational steps performed by the control apparatus to provide the correct control outputs that correspond to the transducer position and the position offset (if any) programmed by the user.

In FIG. 6 is set forth a flow chart of the interrupt routine used by the microcomputer when the programming unit and the PMPODs 18 are physically interconnected into one housing. The steps of the routine are as follows:

STEP 1. At Step 1 the microcomputer 60 fetches the actual machine position from the conversion circuitry or directly from the absolute position transducer and then adds the total of the "Auto Zero" and machine offsets to obtain the machine position as defined above. The result is also referred to as the low index. The number of PMPODs 18 installed is also fetched. A unique high index to each PMPOD 18 is also fetched.

STEP 2. At Step 2 the microcomputer 60 combines the low and high indexes and reads the PMPODs address which, in turn, latches the PMPOD control outputs. The microcomputer 60 then decrements the number of PMPODs 18 installed.

STEP 3. At Step 3 the microcomputer 60 determines whether or not the number of PMPODs 18 installed has reached zero. If so, the microcomputer exits the interrupt routine.

STEP 4. At Step 4 the microcomputer 60 fetches the next high PMPOD index and cycles back to Step 2.

Figure 7:
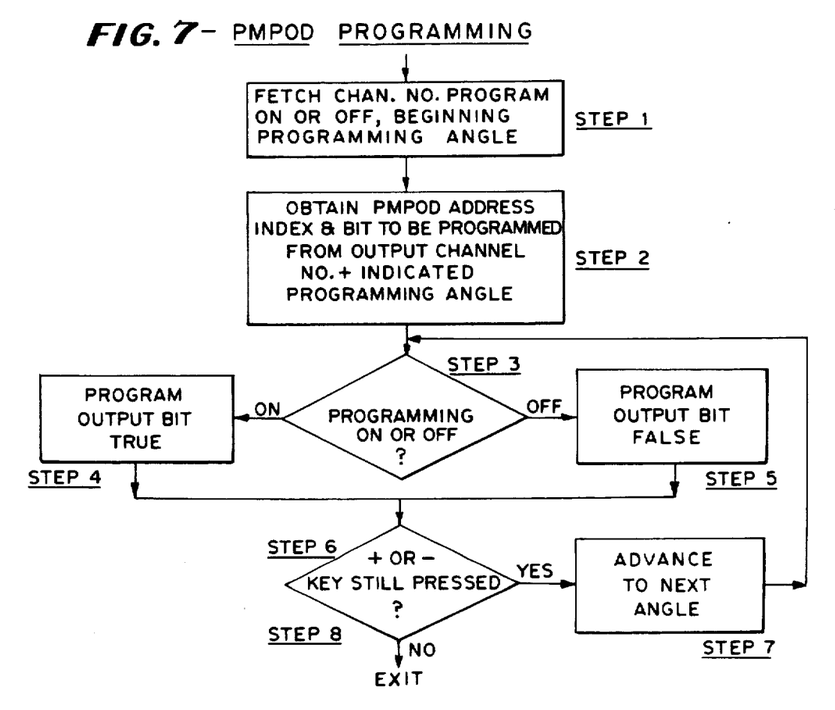
FIG. 7 illustrates a flow diagram of the Programmable Memory Position Output Device (PMPOD) programming routine and sets forth the operational steps performed by the programming unit in identifying to the memory circuit of the control apparatus what PMPOD index is applicable.

In FIG. 7 is set forth a flow chart of the programmable memory position output device programming routine.

STEP 1. At Step 1 the microcomputer 60 fetches the output channel number, the program on/off information and the beginning angle (or other user defined number) to be programmed. These are all obtained from the programming input.

STEP 2. At Step 2 the microcomputer 60 derives the PMPOD address index and the bit to be programmed from the output channel number and the beginning angle (or other user defined number) to be programmed.

STEP 3. At Step 3 the microcomputer 60 determines whether programming is on (true) or off (false).

STEP 4. At Step 4 the microcomputer 60 programs the addressed PMPOD bit true if programming is on.

STEP 5. At Step 5 the microcomputer 60 programs the addressed PMPOD bit false if programming is off.

STEP 6. At Step 6 the PMPOD is programmed and the input is scanned to determine whether programming is still active. If not, the microcomputer exits the routine.

STEP 7. If programming is still active at Step 7, the microcomputer 60 advances to the next angle to be programmed and loops back to Step 3.

From the foregoing description, it will be apparent that the programmable control apparatus 10 (or 100) of the present invention has a number of advantages some of which have been described above and others of which are inherent in the invention. Further, it will be apparent that modifications can be made to the programmable control apparatus 10 (or 100) without departing from the teachings of the present invention. Accordingly, the scope of the invention is only to be limited as necessitated by the accompanying claims.

We claim:

1. A high speed programmable control apparatus including an absolute position transducer which is capable of being coupled to a machine and which has electrical circuitry for generating output signals indicative of and related to the machine position, a programming unit including a microcomputer, visual display means and a data input keyboard, and a plurality of programmable memory output devices (PMPOD) each containing a memory having a portion of a changing transducer output as part of its address and at least one output switching device coupled to said programming unit, each PMPOD being coupled to said microcomputer and to at least one controlled device, said position transducer being coupled to said PMPODS directly or through said programming unit and said control apparatus including means for addressing all PMPODS at the same time with the changing transducer output, each PMPOD being responsive to the changing transducer output.

2. The apparatus of claim 1 wherein said memory in said PMPOD is non-volatile.

3. The apparatus of claim 1 wherein said PMPOD is releasably mounted in said programming unit and releasably coupled to said position transducer.

4. The apparatus of claim 1 wherein said visual display means include a channel display and a position/rpm display.

5. The apparatus of claim 1 wherein said programming unit includes data input means including said keyboard and programming input circuitry.

6. The apparatus of claim 1 including digital conversion circuitry coupled between said electrical circuitry of said position transducer and said microcomputer.

7. The apparatus of claim 6 including interrupt circuitry coupled between said digital conversion circuitry and said microcomputer, said interrupt circuitry being operable to interrupt said microcomputer and activate same to read the absolute position transducer's position upon each rotational movement of said shaft a predetermined increment.

8. The apparatus of claim 1 including a plurality of PMPODs which are parallel coupled to said microcomputer and which are controlled by said programming unit.

9. The apparatus of claim 1 wherein said keyboard includes numerical keys 0 to 9.

10. The apparatus of claim 1 wherein said keyboard includes a tachometer display key which can be actuated for displaying rpm on said visual display means.

11. The apparatus of claim 1 wherein said keyboard includes an angle display key which can be actuated to display the angle of the machine shaft on the visual display means.

12. The apparatus of claim 1 wherein said keyboard includes an offset/scale factor key which can be actuated for displaying the offset or scale factor on the visual display means.

13. The apparatus of claim 1 wherein said keyboard includes a channel key which can be actuated to display the channel on said display means.

14. The apparatus of claim 1 wherein said keyboard includes plus and minus keys which can be actuated for fine-tuning of the data while the machine shaft is in motion.

15. The apparatus of claim 1 wherein each PMPOD further includes at least one latch and an associated control output.

16. The apparatus of claim 1 wherein said microcomputer includes a non-volatile memory.

17. A method for controlling functions of a machine utilizing programmable memory position output devices (PMPODs) having control outputs and an absolute position transducer, comprising the steps of: storing a setpoint program in a memory having memory outputs; reading the position of the absolute position transducer; developing an index address for said position including transducer position and, if necessary, scale factor and/or offset; addressing said memory with said index address; simultaneously updating all control outputs of the PMPODs with the memory outputs to cause starting or stopping of desired machine functions.

18. The method of claim 17 wherein the reaction time of a PMPOD to a change in the absolute position transducer position is less than 100 microseconds.

19. The method of claim 17 including the step of automatically calibrating a position offset and adding same to the position of said absolute position transducer position.

20. The method of claim 17 including the step of automatically scaling the index address.

21. The method of claim 17 wherein said index address is developed with scale factor and offset information in a time period between 50 and 100 microseconds for enabling updating of eight outputs any one of which may have up to or more than 1000 setpoints.

22. An apparatus for controlling functions of a machine including programmable memory position output devices (PMPODs) having control outputs; an absolute position transducer; a memory having memory outputs; means for storing a setpoint program in said memory; means for reading the position of the absolute position transducer; means for developing an index address for said position including transducer position and, if necessary, scale factor and/or offset; means for addressing said memory with said index address; and means for simultaneously updating all control outputs of the PMPODs with the memory outputs to cause starting or stopping of a desired machine function.

23. In a method for controlling functions of a machine utilizing an absolute position transducer and at least one programmable memory position output device (PMPOD) each having a memory and a control output switch, the improvement comprising the steps of: providing each memory with a memory address which includes a portion of the position transducer changing output; enabling each PMPOD to be responsive to the changing transducer output signals and addressing all the PMPODS at the same time with the changing transducer output.

24. In a method for controlling functions of a machine utilizing an absolute position transducer and at least one programmable memory position output device (PMPOD) each having a memory and a control output switch, the improvement comprising the step of: providing each memory with a memory address which includes a portion of the position transducer changing output.

25. In a method for controlling functions of a machine utilizing an absolute position transducer, at least one programmable memory position output device (PMPOD) each having a memory with a memory address which includes a portion of the position transducer changing output and a control output switch, and a computer system, the improvement comprising the steps of: enabling each PMPOD to be responsive to the changing transducer output and addressing all the PMPODS at the same time with the changing transducer output.

26. A high speed programmble control apparatus including an absolute position transducer which is capable of being coupled to a machine and which has electrical circuitry or generating signals indicative of and related to the machine position, a programming unit including a microcomputer, visual display means and a data input keyboard, and a plurality of programmable memory output devices (PMPODS) coupled to said programming unit, each PMPOD including an output switching device and a memory with a memory address and being coupled to said microcomputer, said position transducer being coupled to said PMPODS directly or through said programming unit, said control apparatus including means for addressing all PMPODS at the same time with the changing transducer output, digital conversion circuitry coupled between said electrical circuitry of said position transducer and said microcomputer, and interrupt circuitry coupled between said digital conversion circuitry and said microcomputer, said interrupt circuitry being operable to interrupt said microcomputer and activate same to read the absolute position transducer's position upon each rotational movement of said shaft a predetermined increment and to supply data regarding the position read to all PMPODS.

* * * * *